United States Patent
Ross

(10) Patent No.: US 7,251,246 B2
(45) Date of Patent: Jul. 31, 2007

(54) SELECTIVE PACKET PROCESSING IN A PACKET BASED MEDIA PROCESSOR FOR LATENCY REDUCTION

(75) Inventor: Alan Ross, Winchester, MA (US)

(73) Assignee: SnowShore Networks, Inc., Chelmsford, MA (US)

( * ) Notice: Subject to any disclaimer, the term of this patent is extended or adjusted under 35 U.S.C. 154(b) by 973 days.

(21) Appl. No.: 10/242,979

(22) Filed: Sep. 13, 2002

(65) Prior Publication Data

US 2003/0053461 A1 Mar. 20, 2003

Related U.S. Application Data

(60) Provisional application No. 60/322,369, filed on Sep. 14, 2001.

(51) Int. Cl.
*H04L 12/56* (2006.01)

(52) U.S. Cl. .................. 370/394; 370/412; 370/429

(58) Field of Classification Search .................. None
See application file for complete search history.

(56) References Cited

U.S. PATENT DOCUMENTS

| | | | |
|---|---|---|---|
| 4,890,222 A | 12/1989 | Kirk | |
| 5,237,695 A | 8/1993 | Skokan et al. | |
| 5,384,563 A | 1/1995 | Massey | |
| 5,404,353 A | 4/1995 | Ben-Michael et al. | |
| 5,566,180 A | 10/1996 | Eidson et al. | |
| 5,648,970 A * | 7/1997 | Kapoor | 370/394 |
| 5,740,174 A | 4/1998 | Somer | |
| 5,754,754 A * | 5/1998 | Dudley et al. | 714/18 |
| 5,844,890 A | 12/1998 | Delp et al. | |
| 5,875,309 A | 2/1999 | Itkowsky et al. | |
| 6,157,653 A | 12/2000 | Kline et al. | 370/412 |
| 6,169,732 B1 * | 1/2001 | Hetherington et al. | 370/335 |
| 6,215,789 B1 | 4/2001 | Keenan et al. | |
| 6,236,623 B1 | 5/2001 | Read et al. | |
| 6,246,702 B1 | 6/2001 | Fellman et al. | |
| 6,272,131 B1 | 8/2001 | Ofek | |
| 6,272,151 B1 | 8/2001 | Gupta et al. | |
| 6,359,899 B1 | 3/2002 | Krishnakumar et al. | |
| 6,363,065 B1 | 3/2002 | Thornton et al. | |

(Continued)

OTHER PUBLICATIONS

"RTP: A Transport Protocol for Real-Time Applications", IETF Network Working Group, RFC 1889, Jan. 1996.

*Primary Examiner*—Chi Pham
*Assistant Examiner*—Phuc Tran
(74) *Attorney, Agent, or Firm*—Weingarten, Schurgin, Gagnebin & Lebovici LLP

(57) ABSTRACT

In-sequence media packets that arrive at a media server are processed immediately, and a buffer at the media server is checked for packets whose processing was previously deferred due to out-of-sequence arrival. Any in-sequence packets in the buffer are also processed and forwarded immediately after the processing and forwarding of the received in-sequence packet. Processing and forwarding are deferred for out-of-sequence packets, i.e., packets that are higher in the sequence than the next expected packet, by placing the out-of-sequence packets in the buffer. When a packet is placed in the buffer, a timer is initiated for the missing packet(s). If a pre-determined time passes without the receipt of a missing packet, the missing packet is declared lost and the next-in-sequence received packet is processed and forwarded toward the destination.

8 Claims, 1 Drawing Sheet

U.S. PATENT DOCUMENTS

| | | |
|---|---|---|
| 6,370,159 B1 | 4/2002 | Eidson |
| 6,374,336 B1 | 4/2002 | Peters et al. |
| 6,377,573 B1 | 4/2002 | Shaffer et al. |
| 6,377,579 B1 | 4/2002 | Ofek |
| 6,389,010 B1 | 5/2002 | Kubler et al. |
| 6,389,468 B1 | 5/2002 | Muller et al. |
| 7,061,913 B1 * | 6/2006 | Abrol et al. ................. 370/394 |
| 2002/0031126 A1 * | 3/2002 | Crichton et al. ............ 370/394 |

* cited by examiner

SELECTIVE PACKET PROCESSING IN A PACKET BASED MEDIA PROCESSOR FOR LATENCY REDUCTION

CROSS REFERENCE TO RELATED APPLICATIONS

This application claims priority under 35 U.S.C. §119(e) to U.S. Provisional Patent Application No. 60/322,369 filed Sep. 14, 2001.

STATEMENT REGARDING FEDERALLY SPONSORED RESEARCH OR DEVELOPMENT

Not Applicable

BACKGROUND OF THE INVENTION

The present invention relates to packet switching in data communications networks and more particularly, to a method and apparatus for selectively processing and forwarding received packets in a media processor to reduce latency.

Packet based media processors are deployed to operate on packets of sampled, and sometimes compressed, media data being transmitted across packet switched networks. The types of media contained in the packets can include samples of voice, music, telephony signaling tones and modem signals. In many applications, the packets originate and terminate at gateway and endpoint devices that interface the packet switched networks to the synchronous circuit switched network. The gateway and endpoint devices are generally designed to perform certain functions required in packet-based media communications, such as de-jittering, line echo cancellation, decoding and sample clock regeneration.

Due to the nature of packet switched networks, it is not possible to ensure the arrival rate, arrival sequence, or even arrival itself of all packets in a particular media stream. The possibilities of uneven arrival rate (referred to as "jitter"), out-of-sequence arrival, and non-arrival or loss of packets create problems in re-creating the synchronous sampled media at a receiver such as a gateway or endpoint. Uncompensated jitter can result in significant distortion of the re-created media stream. Additionally, in most cases it is not practical to decode packets out of order or to ignore lost or late packets without degradation in perceived audio quality, for example, or bit errors in facsimile or data signals. Therefore, endpoint devices are typically forced to somehow compensate for these undesirable characteristics of the stream.

One common compensation technique is to employ buffering to smooth out the timing variations and sequence gaps of a received packet media stream. Received packets are placed into a buffer, termed a "jitter buffer", in an asynchronous manner as they are received, and removed from the buffer at a constant rate to achieve the desired fidelity in re-creating the original analog signal. The buffer must be large enough to provide sufficient timing elasticity to enable fixed-rate removal of packets for specified worst-case values of jitter and mis-ordering. The buffer is generally filled to a specified depth before the fixed-rate removal of packets is initiated, to minimize the potential for buffer underflow during times of greater-than-nominal packet spacing. This initial filling represents a fixed delay experienced by the media that is never recovered.

For voice data traveling through packet switched networks, users are able to perceive a delay approaching 200 milliseconds, which is typically associated for example with very long distance circuit switched calls. If the delay is more than 200 milliseconds, it can begin to affect the natural feeling and dynamics of the conversation. Because of the duplex and bursty nature of voice, it may be acceptable to occasionally drop packets that may be late without affecting the overall perceived quality of the call. In some cases, then, voice packets may be judiciously dropped to reduce the delay experienced by a media stream. However, this approach is limited in its effectiveness. Additionally, for other media data such as modem signals, the end-to-end delay is not as important as is the need for smoothing and preventing discontinuities in the reconstructed signal that can result from late or out of order packet arrival.

Therefore, it is important to both minimize any delay introduced by intermediate processing devices in an end-to-end routing path of a packet media stream, and to provide for the best quality reconstructed signal by re-ordering packets where necessary.

BRIEF SUMMARY OF THE INVENTION

In accordance with the present invention, a method and apparatus are disclosed for handling media packets that are received out of sequence at an intermediate media processing device, referred to as a "media server", while minimizing the latency or delay introduced by the device. In part, the disclosed method and apparatus exploit the fact that a media server need not address jitter in a media stream, because the media both enters and exits the media server in packet form. Thus a media server can address the re-ordering of out-of-sequence packets without requiring the delay associated with jitter buffers as known in the art. Media servers can provide a variety of media processing functions, including the transcoding of media from one format into another. The disclosed method and apparatus are particularly suited for use in media servers performing media processing functions that themselves require or otherwise benefit from in-order delivery of input packets.

In the disclosed method, in-sequence packets that arrive at a media server are processed immediately upon arrival. Additionally, a re-ordering buffer is checked for packets whose processing was previously deferred because they arrived out of sequence. If there are packets waiting in the buffer that are now in sequence due to the processing and forwarding of the received packet, then those in-sequence buffered packets are processed and forwarded as well. It is assumed that the packet processing is at least as fast as real time, so that the packet processor can catch up when a sequence gap is closed by the receipt of a missing packet. Once the buffer is emptied, each newly received in-sequence packet can be processed and forwarded immediately.

Upon receipt of an out-of-sequence packet, i.e., a packet that is not next in sequence after the most recently processed and forwarded packet, processing of the out-of-sequence packet is deferred. In particular, the out-of-sequence packet is placed in the re-ordering buffer. Any subsequently received packets that are also out of sequence are also stored in the buffer. As described above, these buffered packets are normally processed in order immediately after receipt and processing of the missing packet(s).

When an out-of-sequence packet is placed in the buffer, a timer is initiated for the missing packet(s). If a pre-determined time passes without receiving a missing packet, the missing packet is declared lost, and the next-in-sequence received packet is processed and forwarded toward the destination. When one or more packets is declared lost, it results in missing packets in the output stream, which normally causes some deleterious effect on the reconstructed media at the destination. It should be noted that this negative effect is no worse than what would occur with a traditional jitter buffer. Normally, however, any "missing" packets are simply delayed a minor amount and are therefore eventually received at the media server within the predetermined time, in which case the output stream contains all the output packets in sequence, with gaps and compressions in the inter-packet timing corresponding to those in the stream of input packets received by the media server. These timing variations or jitter are compensated by a jitter buffer at the destination.

Other features, aspects and advantages of the presently disclosed method and apparatus will be apparent from the Detailed Description of the Invention that follows.

BRIEF DESCRIPTION OF THE SEVERAL VIEWS OF THE DRAWING

The invention will be more fully understood by reference to the following Detailed Description of the Invention in conjunction with the accompanying Drawing, of which.

DETAILED DESCRIPTION OF THE INVENTION

Figure 1:
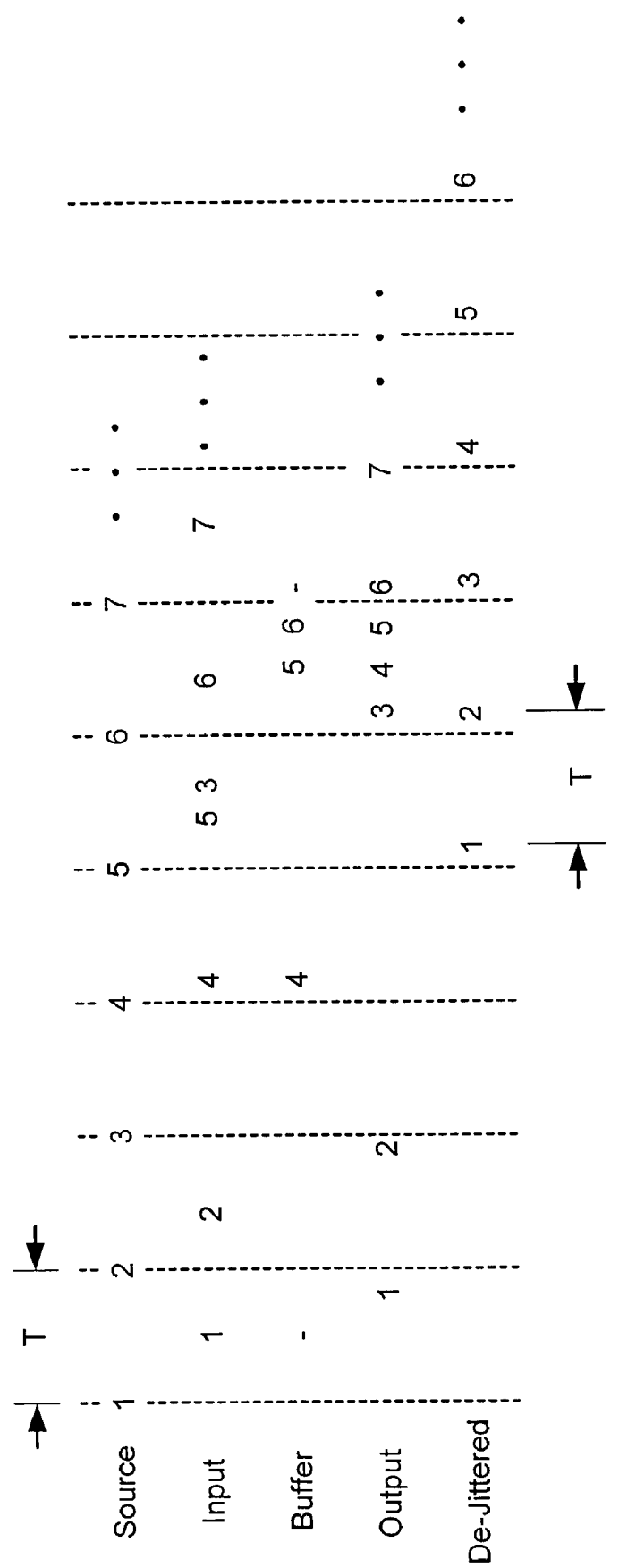
FIG. 1 is a timing diagram illustrating the receiving, buffering, processing and forwarding of media packets at a media server in accordance with the present invention.

FIG. 1 illustrates the flow of media packets at various points in a communications path between a source (Source) and destination (De-jittered), including the input (Input) and output (Output) of a media server in the path and an entry in a re-ordering buffer (Buffer) in the media server. As shown, the source is presumed to be a gateway or endpoint that transmits the packets at regular intervals T. The packets arrive at the media server input (Input) out of order and with significant inter-packet timing jitter. Both out-of-order delivery and inter-packet timing jitter are characteristic of datagram delivery services such as the Internet Protocol (IP). In the situation of FIG. 1 in particular, the packet 3 experiences considerably higher delay than the other packets, and is delivered after packets 4 and 5.

The packets are marked with information that establishes their respective places in the sequence of packets that constitutes the media flow. This sequence marking may be done in various ways. The media transport protocol known as Real Time Protocol (RTP), for example, has provisions for both a sequence number and a timestamp in each packet. Generally, either sequence numbering or timestamp comparisons can be used to order the packets.

As shown in FIG. 1, packets 1 and 2 are received at the media server in sequence, and therefore each is processed substantially immediately and forwarded to the destination. Upon receiving packet 4, the media server determines that this packet is out of sequence because packet 3 has not been received yet, and therefore places packet 4 in the buffer. Additionally, a timer is started for missing packet 3. Upon subsequent receipt of packet 5, packet 5 is also placed in the buffer behind packet 4, and the timer for packet 3 continues to run.

Upon subsequently receiving packet 3 before expiration of the timer, the media server determines that packet 3 is in sequence, because all preceding packets (i.e., packets 1 and 2 in the example of FIG. 1) have already been processed and forwarded to the destination. Therefore, packet 3 is processed and forwarded immediately. Additionally, the buffer is checked to determine if it contains any packets that are now in sequence and therefore eligible for processing. Because packets 1-3 have been processed and forwarded, packets 4 and 5 are now eligible for processing and forwarding, so these actions are taken. Packet 6 is forced to wait a short period in the buffer behind packet 5, and then packet 6 is processed and forwarded. Finally, in-sequence packet 7 is processed and forwarded immediately upon receipt.

The packet processing at the media server is accomplished at least at real-time speed, which is necessary if there is to be any tolerance for mis-ordering. Additionally, the re-ordering buffer is sufficiently deep to accommodate normal fluctuations in the inter-packet interval at the receiver without overflowing.

In some cases, a packet whose delayed arrival is responsible for a current sequence gap at the media server may never arrive, due to transmission errors or other network faults for example. A timer is employed to prevent the media server from waiting indefinitely for a missing packet. When an out-of-sequence packet is placed into the buffer, a timer is started for the missing packet(s). If a missing packet is received before the timer expires, then the received packet and buffered packet(s) are processed as described above. If a missing packet is not received before the timer expires, then it is declared lost, and processing begins with either the next packet in the sequence that is residing in the buffer or, if there are none in the buffer, the next packet received. No attempt is made to obtain the lost packet. Separate timers are used when multiple packets are missing simultaneously, and each timer is associated with one of the missing packets.

Referring again to FIG. 1, it will be observed that the packets appearing at the media server output (Output) are in sequence but continue to exhibit considerable timing jitter. For illustrative purposes, the actions of a jitter buffer at the destination are shown. In this simplified example, the jitter buffer is filled with packets for approximately three nominal inter-packet intervals T before the first packet (packet 1) is removed. Thereafter, the packets are removed at the same interval T as originally transmitted by the source. The interval from the receipt of packet 1 at the destination to its removal from the jitter buffer represents a constant delay experienced by the entire media stream.

It will be appreciated that the contents of the jitter buffer vary considerably over the operational period shown in FIG. 1. Immediately prior to the removal of packet 1, the jitter buffer contains packets 1 and 2, and immediately after the removal of packet 1, the jitter buffer contains only packet 2. Immediately prior to the removal of packet 3, the jitter buffer contains packets 3 through 6. As noted above, the jitter buffer is sized and operated so as to minimize the risk of overflow or underflow based on the statistics of the packet inter-arrival times. If packet ordering is maintained between the media server and the destination, then the jitter buffer need only compensate for jitter. If packet ordering is not maintained, then some re-ordering mechanism is also needed at the destination. It is common to utilize the jitter buffer for re-ordering as well as for de-jittering where necessary.

It is possible for there to be multiple gaps in the packet sequence at the media server at a given time, in which case not all of the packets in the buffer will be in sequence. For example, if packets 3 and 5 are both delayed, the buffer may contain packets 4, 6 and 7 upon the receipt of packet 3. In such a case, packet 4 can be processed in order immediately after packet 3, because it is in sequence. The processing of buffered packets 6 and 7 must be further deferred, however, until packet 5 is either received or declared lost. If packet 5 is received, packets 5-7 are processed and forwarded in order; if packet 5 is declared lost, then only packets 6-7 are processed and forwarded. It should be noted that during the time that both packet 3 and packet 5 are missing, separate timers are running to track the amount of time spent waiting for the respective missing packet.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. At a media server disposed between a source and a destination in a packet-based communications system, a method of generating a stream of output media packets for the destination from a stream of input media packets received from the source, each input media packet containing sequence information identifying the relative location of the input packet in a stream of packets transmitted by the source, the input media packets exhibiting (1) mis-ordering with respect to the order of transmission by the source, and (2) inter-packet timing jitter having a magnitude of at least one nominal inter-packet interval, the method comprising:

upon receiving input media packets including out-of-sequence and in-sequence input media packets, temporarily storing only the out-of-sequence input media packets in a buffer to defer processing of the out-of-sequence input media packets;

upon receiving said in-sequence input media packets, processing each in-sequence input media packet substantially immediately and forward to the destination in order; and accessing from the buffer and processing substantially immediately those out-of-sequence input media packets whose processing was previously deferred when processing is in-sequence, thereby creating the corresponding output media packets, each output media packet being forwarded to the destination substantially immediately after being created.

2. A method according to claim 1, wherein the sequence information in each input packet includes a timestamp indicating a relative time at which the packet was created by the source.

3. A method according to claim 1, wherein the sequence information in each input packet includes a sequence number indicating the relative position of the packet in the stream of packets transmitted by the source.

4. A method according to claim 1, wherein the processing of a received out-of-sequence packet is deferred no more than a predetermined timeout period, and upon expiration of the timeout period the missing packet is declared lost and the next in-sequence received packet is processed.

5. A media server for use between a source and a destination in a packet-based communications system, the source being operative to transmit a stream of media packets in sequence and at regular intervals, the stream of packets arriving at the media server as a stream of input media packets exhibiting (1) mis-ordering with respect to the order of transmission by the source, and (2) inter-packet timing jitter having a magnitude of at least one nominal inter-packet interval, the media server comprising:

a re-ordering buffer operative, upon receipt of input media packets including out-of-sequence input media packets and in-sequence input media packets at said media server, to temporarily store only the received out-of-sequence input media packets to defer processing of the out-of-sequence input media packets; and a media packet processor operative, upon receipt of said in-sequence input media packets, to process substantially immediately and forward to the destination in order the received in-sequence input media packets, and to access from the re-ordering buffer and to process substantially immediately those out-of-sequence input media packets whose processing was previously deferred when processing is in-sequence, thereby creating corresponding output media packets, each output media packet being forwarded to the destination substantially immediately after being created.

6. A media server according to claim 5, wherein each packet transmitted by the source includes a timestamp indicating a relative time at which the packet was created by the source, and wherein the media server is operative to compare respective time stamps of received input media packets to detect their respective positions in the stream of media packets transmitted by the source.

7. A media server according to claim 5, wherein each packet transmitted by the source includes a sequence number indicating the relative position of the packet in the stream of media packets transmitted by the source, and wherein the media server is operative to compare respective sequence numbers of received input media packets to detect their respective positions in the stream of media packets transmitted by the source.

8. A media server according to claim 5, further comprising a timer operative to be started upon detection of a missing packet and to run a predetermined timeout period in the absence of receipt of the missing packet, and wherein the media packet process is operative upon expiration of the timeout period to declare the missing packet lost and to process the next in-sequence received packet.

* * * * *